United States Patent
Miyazaki (10) Patent No.: US 9,596,406 B2
(45) Date of Patent: Mar. 14, 2017

(54) IMAGE PICKUP APPARATUS ASSOCIATING SHOOTER AND SHOT IMAGE, AND CONTROL METHOD FOR THE SAME

(71) Applicant: CANON KABUSHIKI KAISHA, Tokyo (JP)

(72) Inventor: Shigeyuki Miyazaki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/688,409

(22) Filed: Apr. 16, 2015

(65) Prior Publication Data
US 2015/0304550 A1    Oct. 22, 2015

(30) Foreign Application Priority Data
Apr. 18, 2014 (JP) ................. 2014-086317

(51) Int. Cl.
*H04N 5/76* (2006.01)
*H04N 5/232* (2006.01)

(52) U.S. Cl.
CPC ..... *H04N 5/23219* (2013.01); *H04N 5/23222* (2013.01)

(58) Field of Classification Search
CPC ................. H04N 5/23219; H04N 5/23222
USPC ................. 348/231.99, 231.1–231.6
See application file for complete search history.

(56) References Cited

U.S. PATENT DOCUMENTS

2003/0091724 A1* 5/2003 Mizoguchi ......... G06K 9/00087
427/1
2010/0316264 A1* 12/2010 Ferren ............... G07C 9/00158
382/117

FOREIGN PATENT DOCUMENTS

JP    2005-286583 A    10/2005

* cited by examiner

*Primary Examiner* — Yogesh Aggarwal
(74) *Attorney, Agent, or Firm* — Cowan, Liebowitz & Latman, P.C.

(57) ABSTRACT

An image pickup apparatus capable of associating a shooter with a shot image in consideration of shooter's intention. The image pickup apparatus has a first image pickup unit that shoots a subject to obtain a first image and a second image pickup unit that shoots a shooter to obtain a second image. An identification unit identifies a person existing in the first image to obtain first identification information and identifies a person existing in the second image to obtain second identification information. A recording unit records the second identification information as shooter information in metadata of the first image, together with the second image. If, after the person existing in the second image is identified, the same person as the person identified from the second image is identified from the first image, identification information about the same person is recorded as the shooter information in the metadata.

12 Claims, 9 Drawing Sheets

| IDENTIFICATION INFORMATION | RECORDING DESTINATION | UPLOAD DESTINATION | SHOOTER NAME |
|---|---|---|---|
|  | ¥DCIM¥TAROFLDR¥ | | TARO |
|  | ¥DCIM¥HANAFLDR¥ | | HANAKO |
|  | ¥DCIM¥UPLOAD01 | http://upload.**.com&id=family | FAMILY |

FIG. 8A

| | SHOOTER | RECORDING DESTINATION | IMAGE PICKUP DATE AND TIME |
|---|---|---|---|
| 1001a | TARO | ¥DCIM¥TAROFLDR¥IMG_0001.JPG | 2012/3/12 15:15 |
| 1002a | TARO | ¥DCIM¥TAROFLDR¥IMG_0002.JPG | 2012/3/12 15:15 |
| 1003a | UNREGISTERED PERSON | ¥DCIM¥DEFOFLDR¥IMG_0003.JPG | 2012/3/12 15:17 |
| 1004a | HANAKO | ¥DCIM¥HANAFLDR¥IMG_0004.JPG | 2012/3/12 15:18 |
| 1005a | FAMILY | ¥DCIM¥UPLOAD01¥IMG_0005.JPG | 2012/3/12 15:19 |
| 1006a | TARO | ¥DCIM¥TAROFLDR¥IMG_0006.JPG | 2012/3/12 15:19 |
| | | | |
| | | | |
| | | | |

FIG. 8B

| | SHOOTER | RECORDING DESTINATION | IMAGE PICKUP DATE AND TIME |
|---|---|---|---|
| 1001a | TARO | ¥DCIM¥TAROFLDR¥IMG_0001.JPG | 2012/3/12 15:15 |
| 1002a | TARO | ¥DCIM¥TAROFLDR¥IMG_0002.JPG | 2012/3/12 15:15 |
| 1003b | TARO | ¥DCIM¥TAROFLDR¥IMG_0003.JPG | 2012/3/12 15:17 |
| 1004b | TARO | ¥DCIM¥TAROFLDR¥IMG_0004.JPG | 2012/3/12 15:18 |
| 1005b | TARO | ¥DCIM¥TAROFLDR¥IMG_0005.JPG | 2012/3/12 15:19 |
| 1006a | TARO | ¥DCIM¥TAROFLDR¥IMG_0006.JPG | 2012/3/12 15:19 |
| | | | |
| | | | |
| | | | |

IMAGE PICKUP APPARATUS ASSOCIATING SHOOTER AND SHOT IMAGE, AND CONTROL METHOD FOR THE SAME

BACKGROUND OF THE INVENTION

Field of the Invention

The present invention relates to an image pickup apparatus and a control method therefor, and more particularly to an image pickup apparatus capable of associating an image obtained as a result of image pickup with a shooter who has shot the image, and a control method therefor.

Description of the Related Art

In general, though there may be a case where an image pickup apparatus such as a digital camera is personally owned and used, there may also be a case where an image pickup apparatus is shared and used among multiple persons such as family members. When image pickup is performed by multiple persons in the case where an image pickup apparatus is shared among the multiple persons, it may be difficult to confirm by whom shot images recorded in a memory provided in the image pickup apparatus were shot.

Conventionally, there has been an image pickup apparatus provided with a fingerprint sensor on a shutter button. In this image pickup apparatus, when image pickup is performed, the fingerprint of a finger which has pressed the shutter button is compared. Then, a shooter who has pressed down the shutter button is identified on the basis of the comparison so that a shot image is recorded in a folder for each shooter (see Japanese Laid-Open Patent Publication (Kokai) No. 2005-286583).

By the way, when a shooter shoots himself/herself as a subject by an image pickup apparatus, he/she may hand over the image pickup apparatus to another person to request the person to perform image pickup. In this case, since the different person to whom the image pickup apparatus has been handed over presses the shutter button, an image is judged to be an image by the different person though the composition or the subject is intended by the particular shooter.

That is, though a particular shooter intends image pickup and requests another person to perform the image pickup, a shot image is not recorded in a folder for the particular shooter but is recorded in a different folder. As a result, though the image pickup is performed by the particular shooter's intention, it is not possible to associate the particular shooter with the shot image.

SUMMARY OF THE INVENTION

The present invention provides an image pickup apparatus capable of associating a shooter with a shot image in consideration of the shooter's intention and a control method therefor.

Accordingly, the present invention provides an image pickup apparatus at least provided with a first image pickup unit configured to shoot a subject to obtain a first image and a second image pickup unit configured to shoot a shooter to obtain a second image, the image pickup apparatus comprising an identification unit configured to identify a person existing in the first image to obtain first identification information and identify a person existing in the second image to obtain second identification information, a recording unit configured to record the second identification information as shooter information in metadata of the first image shot by the first image pickup unit, together with the second image, and a control unit configured to, if, after the person existing in the second image is identified, the same person as the person identified from the second image is identified from the first image, perform control so that identification information about the same person is recorded as the shooter information in the metadata of the first image.

According to the present invention, when first identification information corresponding to second identification information exists, it is judged that image pickup at a current point of time has been performed by a shooter who performed image pickup last. Therefore, even when a person who has been operating an image pickup apparatus and shooting an image intentionally has proxy image pickup performed by another person, an image can be regarded as an image shot by the original shooter. As a result, it is possible to associate a shooter with a shot image in consideration of the shooter's intention.

Further features of the present invention will become apparent from the following description of exemplary embodiments (with reference to the attached drawings).

BRIEF DESCRIPTION OF THE DRAWINGS

FIGS. 5A to 5C are diagrams showing an example of a shooter candidate history and a shooter candidate list stored in a memory shown in FIG. 1, among which FIG. 5A is an example of the shooter candidate history, FIG. 5B is another example of the shooter candidate history and FIG. 5C is a diagram showing an example of the example of the shooter candidate list.

FIGS. 8A and 8B are diagrams for illustrating an example of an image record list recorded in the memory shown in FIG. 1, between which

DESCRIPTION OF THE EMBODIMENTS

An example of an image pickup apparatus according to an embodiment of the present invention will be described below with reference to drawings.

Figure 1:
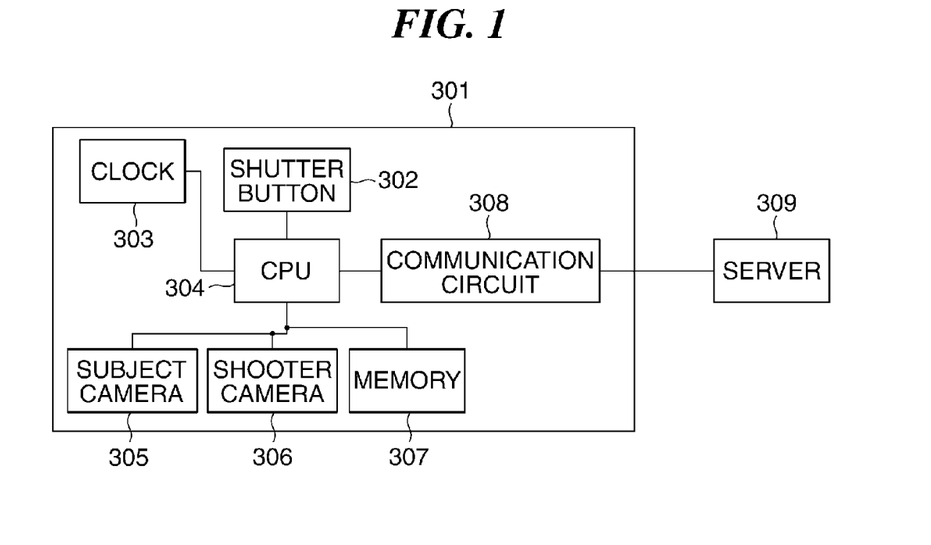
FIG. 1 is a block diagram schematically showing a configuration of an example of an image pickup apparatus according to an embodiment of the present invention.

FIG. 1 is a block diagram schematically showing a configuration of an example of an image pickup apparatus 301 according to an embodiment of the present invention.

The image pickup apparatus 301 shown in FIG. 1 is, for example, a digital camera (hereinafter simply referred to as a camera) and is provided with a shutter button 302, a clock 303, a CPU 304, a first image pickup section 305, a second image pickup section 306, a memory 307 and a communication circuit 308. Here, the first image pickup section 305 is an image pickup section for shooting a subject, and the second image pickup section 306 is an image pickup section for shooting a shooter (or a shooter candidate) who shoots the subject by the camera (that is, the first image pickup section 305).

In the description below, the first image pickup section 305 will be referred to as a subject camera, and the second image pickup section 306 will be referred to as a shooter camera.

The CPU 304 is a central processing unit which is responsible for control of the whole camera and performs various information processing. Processes to be described later are performed under the control of the CPU 304.

The shutter button 302 is a button for specifying a timing for performing image pickup in the camera 301 to the CPU 304. At the time of performing image pickup and a process related to the image pickup, the CPU 304 acquires current time from the clock 303.

The subject camera 305 described before is for a shooter candidate who operates the camera 301 to shoot an object (subject) which is an image pickup target. It should be noted that the shooter candidate refers to a person who has probably pressed down the shutter button 302.

On the other hand, the shooter camera 306 is for shooting a shooter candidate who operates the camera 301. Here, a person whom the subject camera 305 captures immediately before the shutter button 302 is pressed down is regarded as the shooter candidate.

The memory 307 is a memory where reading out and writing in is possible and is mainly used as a work area of the CPU 304 and a buffer for data. Furthermore, in the memory 307, an image obtained as a result of image pickup by the subject camera 305 (hereinafter referred to as a subject image) is recorded, and image pickup time and a history of shooter candidates are also recorded.

Further, in the memory 307, an image of a person whom the shooter camera 306 captures immediately before the shutter button 302 is pressed down is recorded as a shooter candidate image. It should be noted that a judgment program for judging a shooter candidate is recorded in the memory 307.

The communication circuit 308 is connected to the CPU 304, and the CPU 304 can transfer an image shot by the camera 301 (that is, a subject image and a shooter candidate image) to a server 309 via the communication circuit 308.

Figure 2:
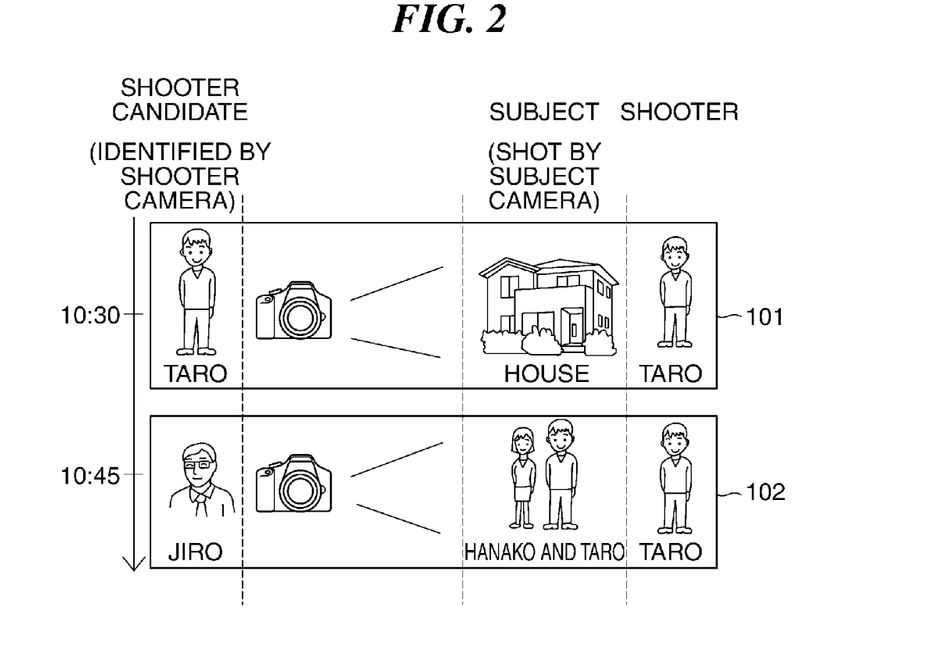
FIG. 2 is a diagram for illustrating a judgment process for judging a shooter candidate as a shooter performed in the camera shown in FIG. 1.

FIG. 2 is a diagram for illustrating a judgment process for judging a shooter candidate as a shooter performed in the camera 301 shown in FIG. 1.

The example shown in FIG. 2 shows a process for, when, at the time of shooting a subject (that is, at the time of current image pickup), a shooter of a subject image obtained by image pickup immediately before the current image pickup exists as a subject, not a shooter candidate in the current image pickup but the shooter in the immediately previous image pickup is determined as a shooter in the current image pickup.

In an image pickup situation 101, a subject image shot at 10:30, and a shooter candidate and shooter of the subject image are shown. In the image pickup situation 101, the shooter candidate is "Taro", and the subject is a "house". The shooter is "Taro".

In an image pickup situation 102, a subject image shot at 10:45, and a shooter candidate and shooter of the subject image are shown. In the image pickup situation 102, the shooter candidate is "Jiro", and the subject is "Taro and Hanako". The shooter is "Taro".

In the image pickup situation 102, though the shooter camera 306 captured "Jiro" who is a shooter candidate, "Taro" is regarded as the shooter who performed image pickup because the subject camera 305 captured Taro who performed image pickup immediately before (that is, in the image pickup situation 101). That is, though the shooter camera 306 captured "Jiro" as a shooter candidate in the image pickup situation 102, "Taro" who is an immediately previous shooter exists in the subject image, and, therefore, "Taro" is regarded as the shooter.

Figure 3:
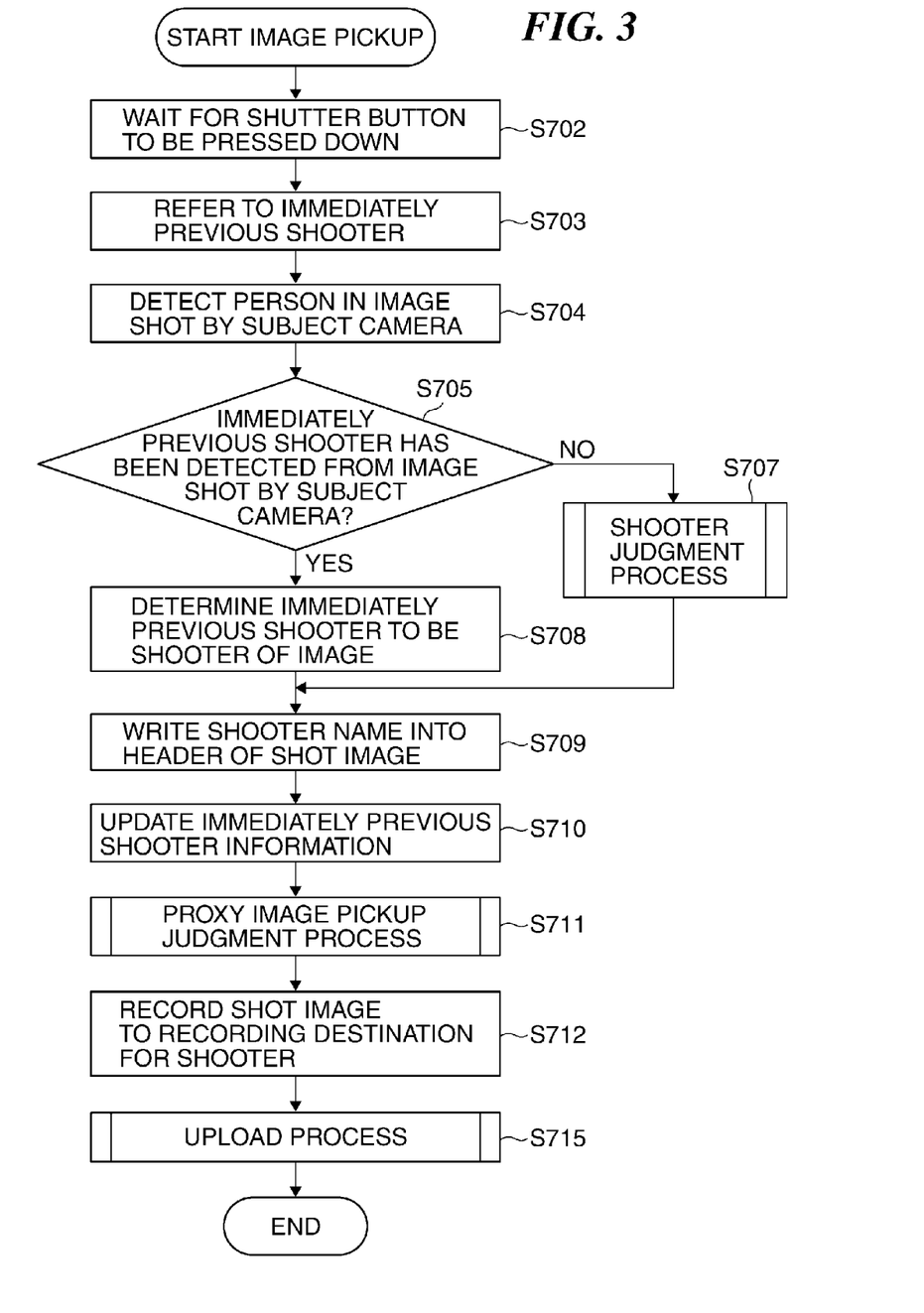
FIG. 3 is a flowchart for illustrating the judgment process shown in FIG. 2.

FIG. 3 is a flowchart for illustrating the judgment process shown in FIG. 2. It should be noted that the process according to the flowchart shown in FIG. 3 is performed under the control of the CPU 304.

When image pickup is started, the CPU 304 waits for the shutter button 302 to be pressed down (step S702). When the shutter button 302 is pressed down, the CPU 304 reads out a shooter image shot immediately before from the memory 307 on the basis of the image pickup time, and refers to an immediately previous shooter (step S703).

Next, the CPU 304 detects persons existing in a subject image obtained by image pickup by the subject camera 305 (that is, a subject image at a current point of time) (step S704). Then, the CPU 304 judges whether or not the shooter read out at the process of step S703 exists among the persons detected in step S704 (step S705).

When the shooter exists among the detected persons (step S705: YES), the CPU 304 determines the shooter who performed image pickup immediately before to be a shooter of the subject image obtained by image pickup performed this time (step S708). Then, the CPU 304 writes a shooter name into the header of the subject image (step S709). That is, the CPU 304 adds the shooter name to the subject image.

On the other hand, if the shooter does not exist among the persons detected in step S704 (step S705: NO), the CPU 304 performs a shooter judgment process (step S707).

Figure 4:
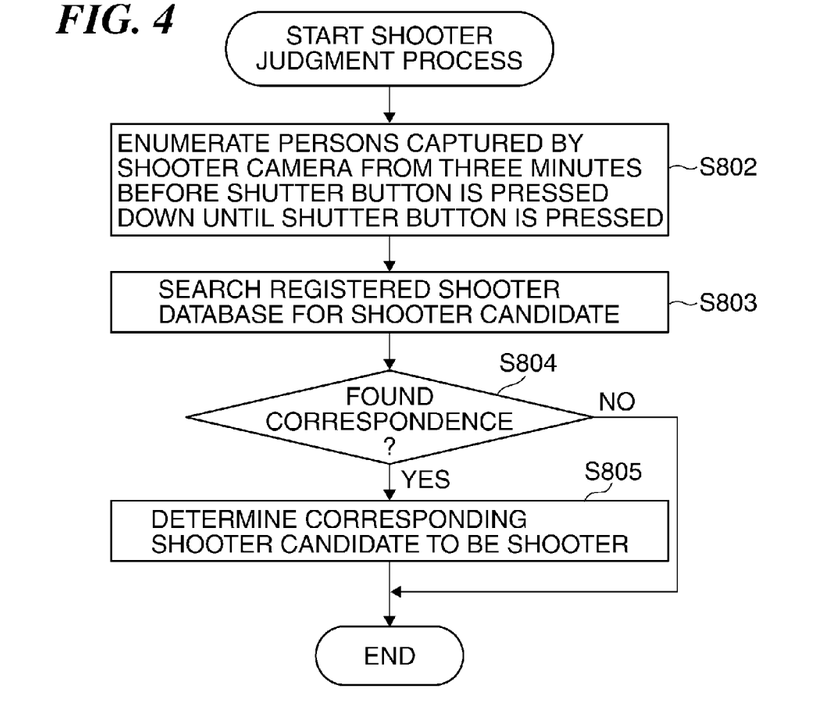
FIG. 4 is a flowchart for illustrating a shooter judgment process shown in FIG. 3.

FIG. 4 is a flowchart for illustrating the shooter judgment process shown in step S707 in FIG. 3.

When having started the shooter judgment process, the CPU 304 enumerates all persons that the shooter camera 306 has captured within a predetermined time (for example, three minutes) before the shutter button 302 is pressed down, from a shooter candidate list stored in the memory 307 (step S802).

Figure 5A:
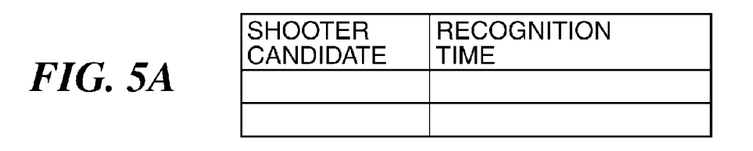
Figure 5B:
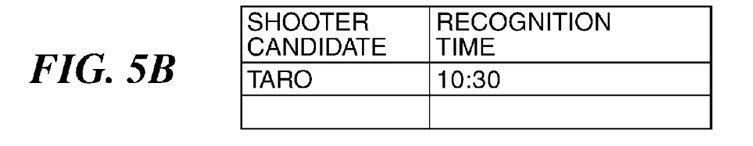
Figure 5C:
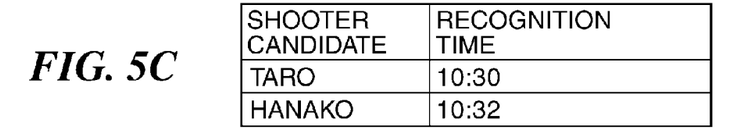

FIGS. 5A to 5C are diagrams showing an example of a shooter candidate history and the shooter candidate list stored in the memory 307 shown in FIG. 1. FIG. 5A is a diagram showing an example of the shooter candidate history, and FIG. 5B is a diagram showing another example of the shooter candidate history. FIG. 5C is a diagram showing an example of the shooter candidate list.

In the examples shown in FIGS. 5A to 5C, the shooter candidate history is provided with a shooter candidate field and a recognition time field, and, similarly, the shooter candidate list is provided with a shooter candidate field and a recognition time field.

Figure 6:
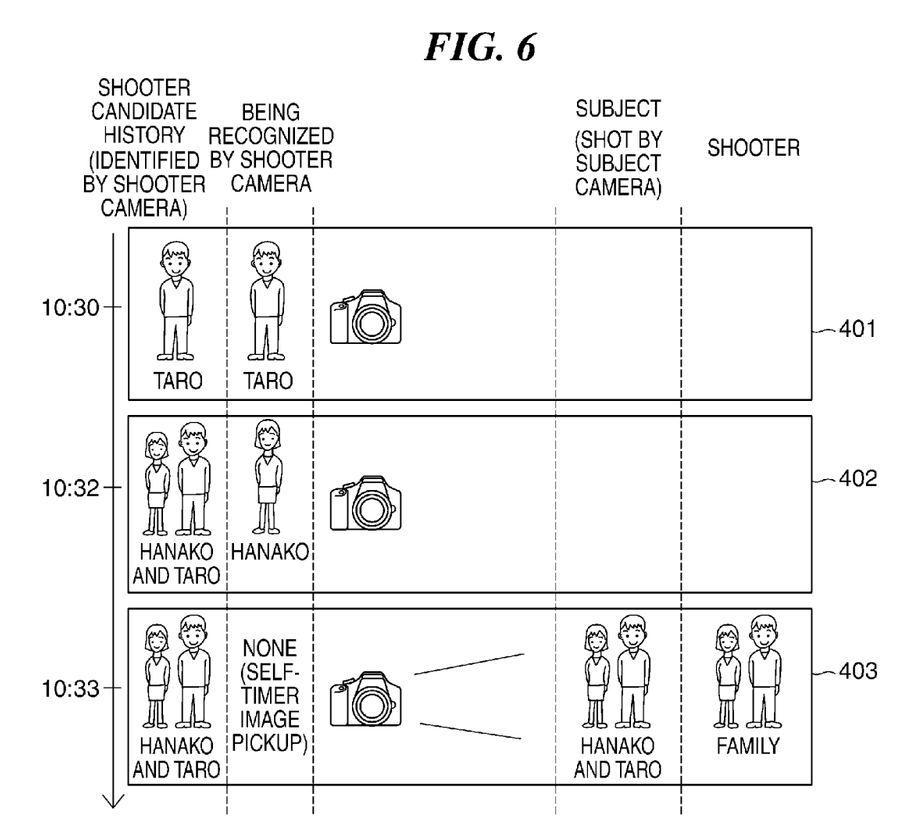
FIG. 6 is a diagram for illustrating update of the shooter candidate list shown in FIG. 5C.

FIG. 6 is a diagram for illustrating update of the shooter candidate list shown in FIG. 5C.

In FIG. 6, since the shooter camera 306 captured "Taro" in an image pickup situation 401, the CPU 304 writes identification information indicating "Taro" and the time of having identified "Taro" (10:30) into the shooter candidate history stored in the memory 307. Thereby, the shooter candidate history is updated from the state shown in FIG. 5A to the state shown in FIG. 5B.

Next, since the shooter camera 306 captured "Hanako" in an image pickup situation 402 two minutes after the image pickup situation 401 (that is, 10:32), the CPU 304 writes identification information indicating "Hanako" and the time of having identified "Hanako" (10:32) into the shooter candidate history stored in the memory 307. Thereby, the shooter candidate history is updated from the state shown in FIG. 5B to the state shown in FIG. 5C.

After that, when image pickup is performed three minutes after the image pickup situation 401 (that is, 10:33) (that is, in an image pickup situation 403), the CPU 304 regards all persons that the shooter camera 306 has captured within three minutes before the shutter button 302 is pressed down as shooter candidates. As a result, "Taro" and "Hanako" become shooter candidates in the image pickup situation 403, and the shooter candidate history shown in FIG. 5C becomes a shooter candidate list. Therefore, in the process of step S802, the CPU 304 enumerates "Taro" and "Hanako" as shooter candidates.

Figure 7:
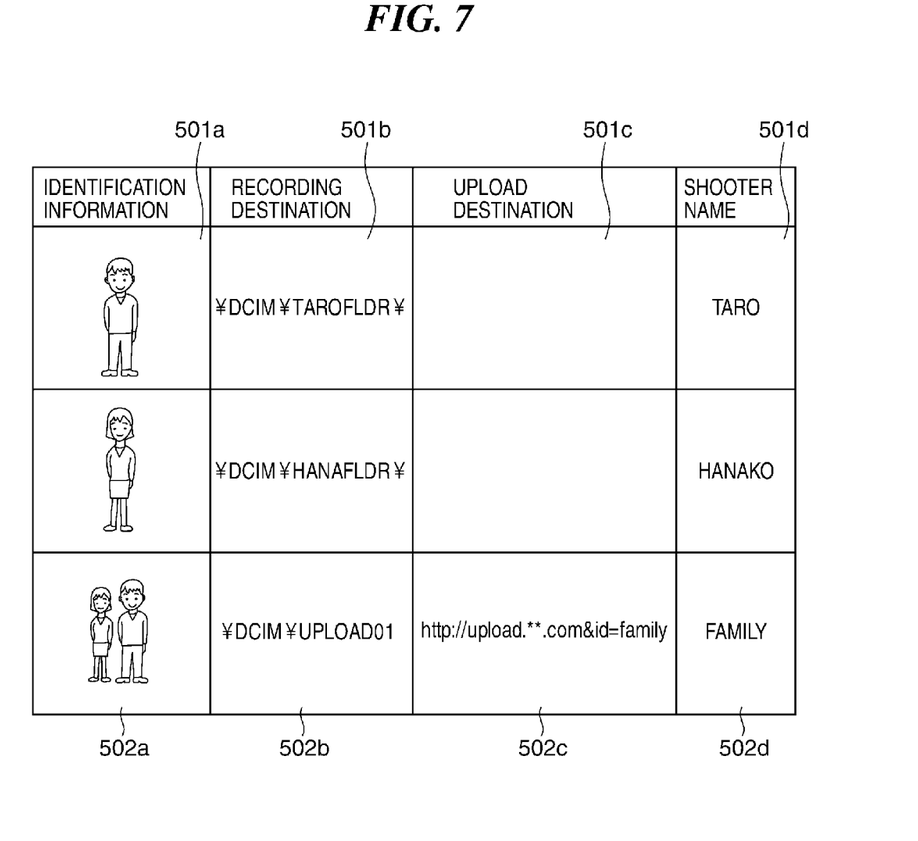
FIG. 7 is a diagram showing an example of a registered shooter database stored in the memory shown in FIG. 1.

FIG. 7 is a diagram showing an example of a registered shooter database stored in the memory 307 shown in FIG. 1.

The registered shooter database shown in FIG. 7 has an identification information field, a recording destination field, an upload destination field and a shooter name field. An image of a shooter is recorded in the identification information field as identification information. A filename of a file in which the identification information is recorded is recorded in the recording destination field.

The URL of an upload destination is recorded in the upload destination field. A shooter's name is recorded in a shooter name field. It should be noted that the registered shooter database is a database in which, for each user using the camera 301, user information for identifying the user is associated with shooter identification information.

Referring to FIG. 4 again, after enumerating the shooter candidates, the CPU 304 searches the registered shooter database for a shooter candidate corresponding to any of the shooter candidates (step S803). Then, the CPU 304 judges whether or not the shooter candidate corresponding to any of the enumerated shooter candidates exists in the registered shooter database (step S804).

If the shooter candidate corresponding to any of the enumerated shooter candidates does not exist (step S804: NO), the CPU 304 ends the shooter judgment process and proceeds to the process of step S709 shown in FIG. 3. If the shooter candidate corresponding to any of the enumerated shooter candidates exists (step S804: YES), the CPU 304 acquires the shooter name of the shooter candidate from the registered shooter database. Then, the CPU 304 ends the shooter judgment process and proceeds to the process of step S709 shown in FIG. 3.

For example, in the example shown in FIG. 7, identification information (an image) of "Taro" and "Hanako" is recorded in the registered shooter database as identification information 502a. Further, since the CPU 304 has enumerated the two of "Taro" and "Hanako" from the shooter candidate list, "Family" is recorded as a shooter name as shown in a shooter name 502d.

Referring to FIG. 3 again, after the shooter judgment process, the CPU 304 compares identification information about the shooter with the shooter identification information in the registered shooter database in the process of step S709. If the identification information corresponds to any of the shooter identification information, the CPU 304 writes the shooter name in the registered shooter database into the header of the subject image. For example, in the image pickup situation 102 shown in FIG. 2, the identification information about the shooter corresponds to identification information 501a in the registered shooter database, and, therefore, the CPU 304 writes a shooter name 501d (that is, "Taro") into the header of the subject image.

On the other hand, if corresponding identification information does not exist in the registered shooter database, the CPU 304 leaves the header of the subject image without a shooter name to be written there.

After the process of step S709, the CPU 304 updates information about the immediately previous shooter recorded in the memory 307 (step S710). For example, in the case of the image pickup situation 102 shown in FIG. 2, the CPU 304 does not record a shooter candidate "Jiro" as the immediately previous shooter but records "Taro" judged to be a shooter into the memory 307 as the immediately previous shooter.

Figure 8A:
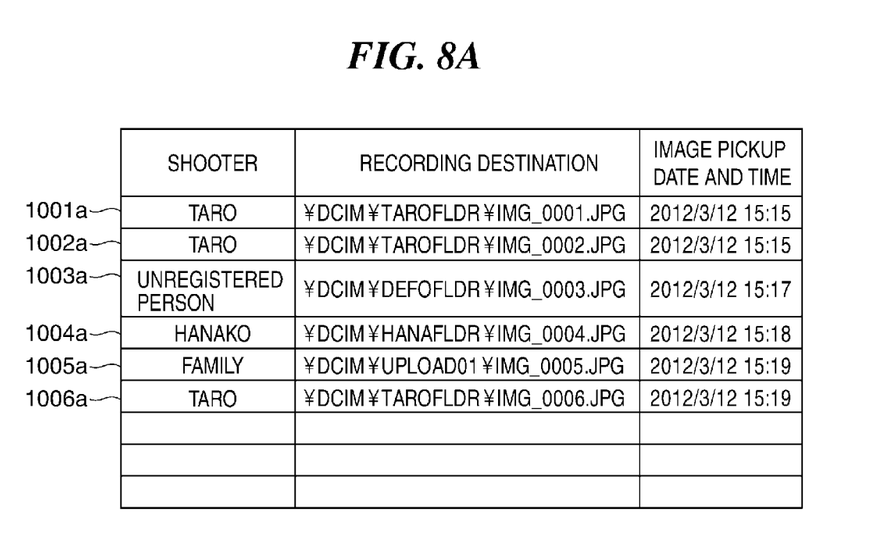
FIG. 8A is a diagram showing the image record list before update.
Figure 8B:
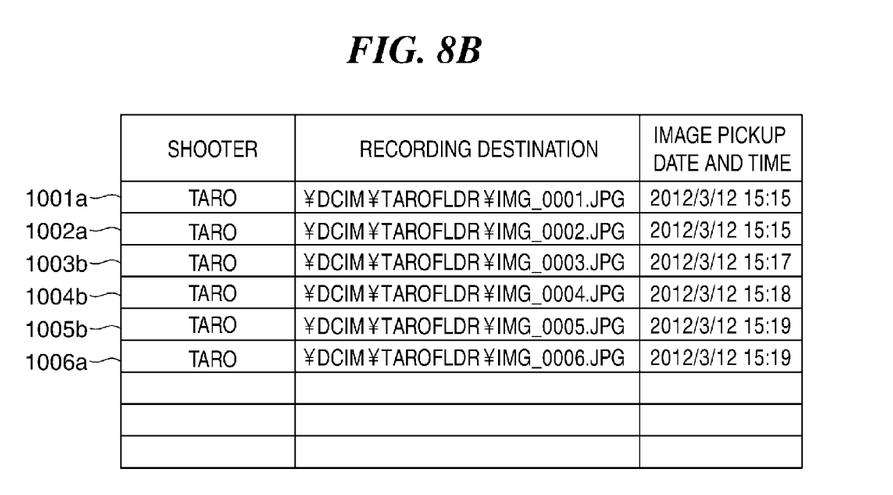
FIG. 8B is a diagram showing the image record list after update.

FIGS. 8A and 8B are diagrams for illustrating an example of an image record list recorded in the memory 307 shown in FIG. 1. FIG. 8A is a diagram showing an example of the image record list before update, and FIG. 8B is a diagram showing the image record list after update.

As shown in FIG. 8A, a shooter, a recording destination (folder) and an image pickup date and time are recorded in the image record list (that is, an image pickup history) each time image pickup is performed. The CPU 304 can know a shooter who performed image pickup last by referring to this image record list. In the example shown in FIG. 8A, the shooter who performed image pickup last is "Taro" 1006a.

Referring to FIG. 3 again, the CPU 304 performs a proxy image pickup judgment process (step S711). The proxy image pickup judgment process is a process for judging whether or not another person has been requested to perform proxy image pickup.

Figure 9:
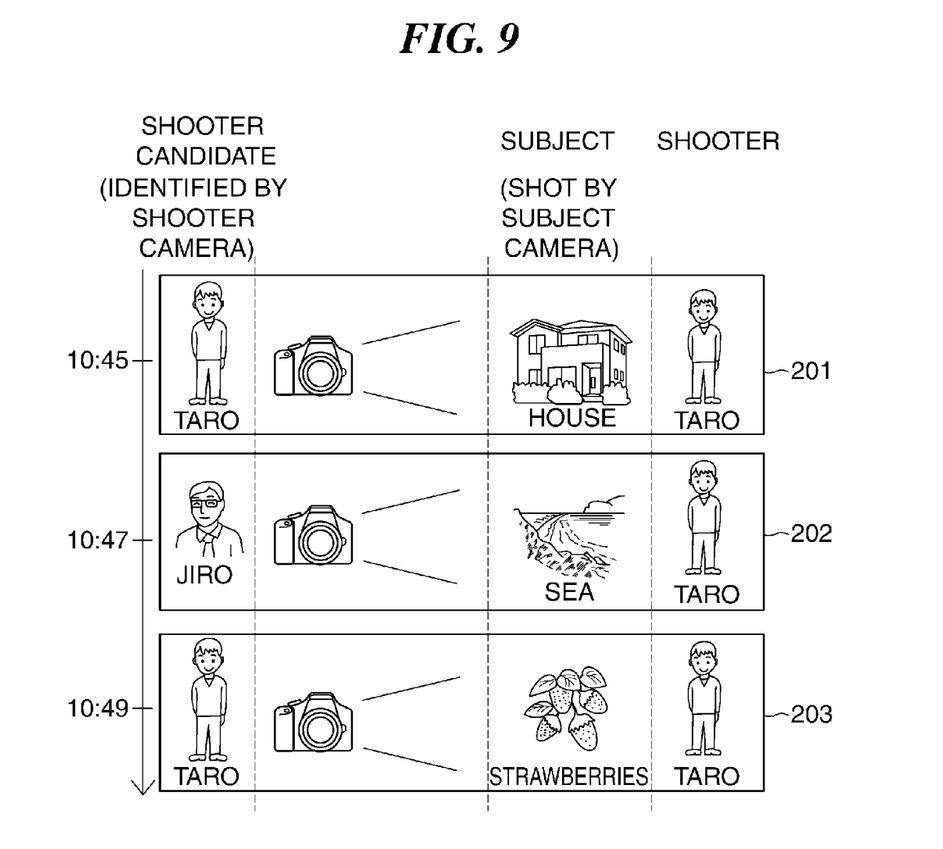
FIG. 9 is a diagram for illustrating an example of a proxy image pickup judgment process performed in a CPU shown in FIG. 1.

FIG. 9 is a diagram for illustrating an example of the proxy image pickup judgment process performed by the CPU 304 shown in step S711 in FIG. 3.

Even if another person is requested to perform proxy image pickup, the CPU 304 judges that a requester shot an image shot by proxy image pickup if the requester performs image pickup again within a predetermined time. In the example shown in FIG. 9, image pickup is performed three times in image pickup situations 201 to 203. Then, image pickup times in the image pickup situations 201, 202 and 203 are 10:45, 10:47 and 10:49, respectively.

In the image pickup situation 201, "Taro" operates the camera as a shooter candidate and shoots a "house" which is a subject. In the image pickup situation 202, "Jiro" operates the camera as a shooter candidate and shoots the "sea" which is a subject. Further, in the image pickup situation 203, "Taro" operates the camera as a shooter candidate and shoots "strawberries" which are a subject again.

In the example shown in FIG. 9, the CPU 304 judges that the shooter is "Taro" in all the image pickup situations 201 to 203. That is, since "Taro" who is a shooter performs image pickup in the image pickup situation 203 within a predetermined time (for example, five minutes) after "Jiro" who is a shooter candidate performs image pickup in the image pickup situation 202, the CPU 304 judges that the shooter in the image pickup situation 202 is "Taro".

Here, the CPU 304 judges that an image which "Jiro" who is a shooter candidate has shot is an image obtained by "Taro" intentionally requesting "Jiro" to perform image pickup (proxy image pickup request).

Figure 10:
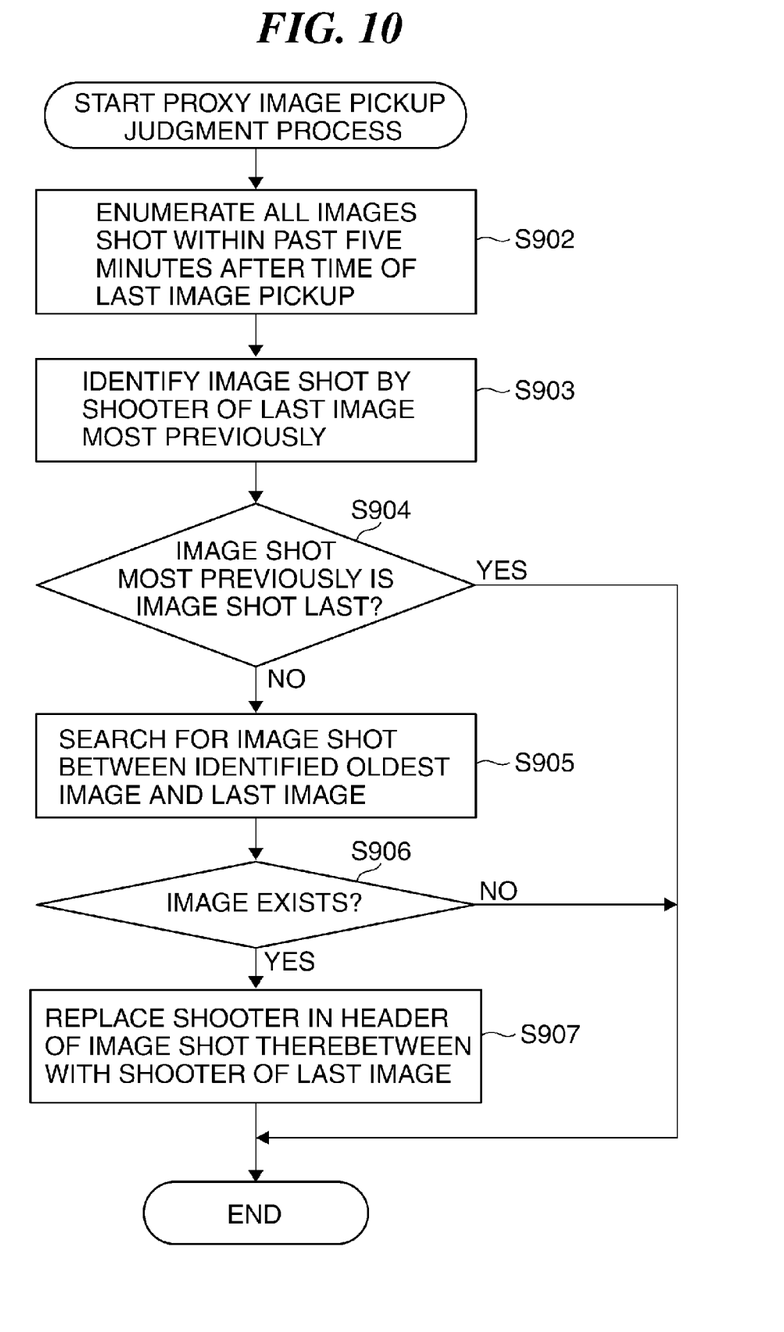
FIG. 10 is a flowchart for illustrating the proxy image pickup judgment process shown in FIG. 3.

FIG. 10 is a flowchart for illustrating the proxy image pickup judgment process shown in step S711 in FIG. 3.

When having started the proxy image pickup judgment process, the CPU 304 enumerates all images that have been shot within a predetermined time (for example, the past five minutes) after the time when image pickup was performed last (step S902). At the time of the process of step S902, the CPU 304 refers to, for example, the image record list shown in FIG. 8A.

In the image record list shown in FIG. 8A, the image 1006a is an image obtained by the last image pickup. Since the image pickup time of the image 1006a is Mar. 12, 2012, 15:19, subject images shot within five minutes after the image (subject image) 1006a are images 1001a, 1002a, 1003a, 1004a and 1005a.

Next, the CPU 304 identifies the oldest subject image of the shooter of the last subject image 1006a from among the subject images 1001a to 1005a shot within five minutes after the subject image 1006a (step S903). In the example shown in FIG. 8A, the subject image 1001a is the oldest subject image among subject images shot by "Taro" who shot the subject image 1006a within five minutes.

Next, the CPU 304 judges whether or not the identified subject image is the same image as the subject image that the shooter shot last (step S904). If the oldest image among the subject images shot within the past five minutes is the same image as the subject image shot last (step S904: YES), the CPU 304 judges that proxy image pickup has not been performed. Then, the CPU 304 ends the proxy image pickup judgment process and proceeds to the process of step S712 in FIG. 3.

On the other hand, if the oldest image among the subject images shot within the past five minutes is not the same image as the subject image shot last (step S904: NO), the CPU 304 searches for subject images shot by other persons between the oldest subject image and the image shot last (step S905). In the example shown in FIG. 8A, the subject images 1003a, 1004a and 1005a are enumerated as subject images shot by other persons.

Next, the CPU 304 judges whether the subject images shot by other persons exist or not (step S906). If the subject images shot by other person do not exist (step S906: NO), the CPU 304 judges that proxy image pickup has not been performed. Then, the CPU 304 ends the proxy image pickup judgment process and proceeds to the process of step S712 in FIG. 3.

On the other hand, if the subject images shot by other persons exist (step S906: YES), the CPU 304 replaces shooters recorded in the headers of the subject images shot by other persons with the shooter who shot the last subject image and changes the recording destination of the subject images (step S907).

Thereby, the image record list shown in FIG. 8A is updated to the image record list shown in FIG. 8B. In the image record list shown in FIG. 8B, the shooters and recording destinations of the subject images 1003a, 1004a and 1005a are changed and recorded as subject images 1003b, 1004b and 1005b.

Next, the CPU 304 records the subject images to a recording destination corresponding to the shooter. Recording destinations corresponding to shooters are registered with the registered shooter database described with reference to FIG. 7. Here, the CPU 304 decides a recording destination by comparing identification information about the shooter with the shooter identification information in the registered shooter database. For example, in the image pickup situation 102 shown in FIG. 2, the identification information about the shooter corresponds to the identification information 501a in the registered shooter database, and, therefore, the CPU 304 determines a recording destination 501b as the recording destination of the subject image.

It should be noted that, if corresponding identification information about the shooter does not exist in the registered shooter database, the CPU 304 determines "¥DCIM¥DEFOFLDER¥", which is a predetermined folder, as the recording destination of the subject image.

After that, the CPU 304 uploads the subject images to the server 309 (step S715) and ends image pickup.

Here, for each shooter, whether or not to upload subject images is registered with the registered shooter database shown in FIG. 7. Here, the CPU 304 judges whether or not to upload by comparing the identification information about the shooter with the shooter identification information in the registered shooter database.

The identification information about the shooter in the image pickup situation 102 shown in FIG. 2 corresponds to the identification information 501a in the registered shooter database. However, since an upload destination is not specified, the CPU 304 does not upload the subject images to the server 309.

On the other hand, if the identification information about the shooter corresponds to the identification information 502a in the registered shooter database, the CPU 304 starts the process for uploading the subject images to the server 309 because an upload destination 502c is specified here.

Figure 11:
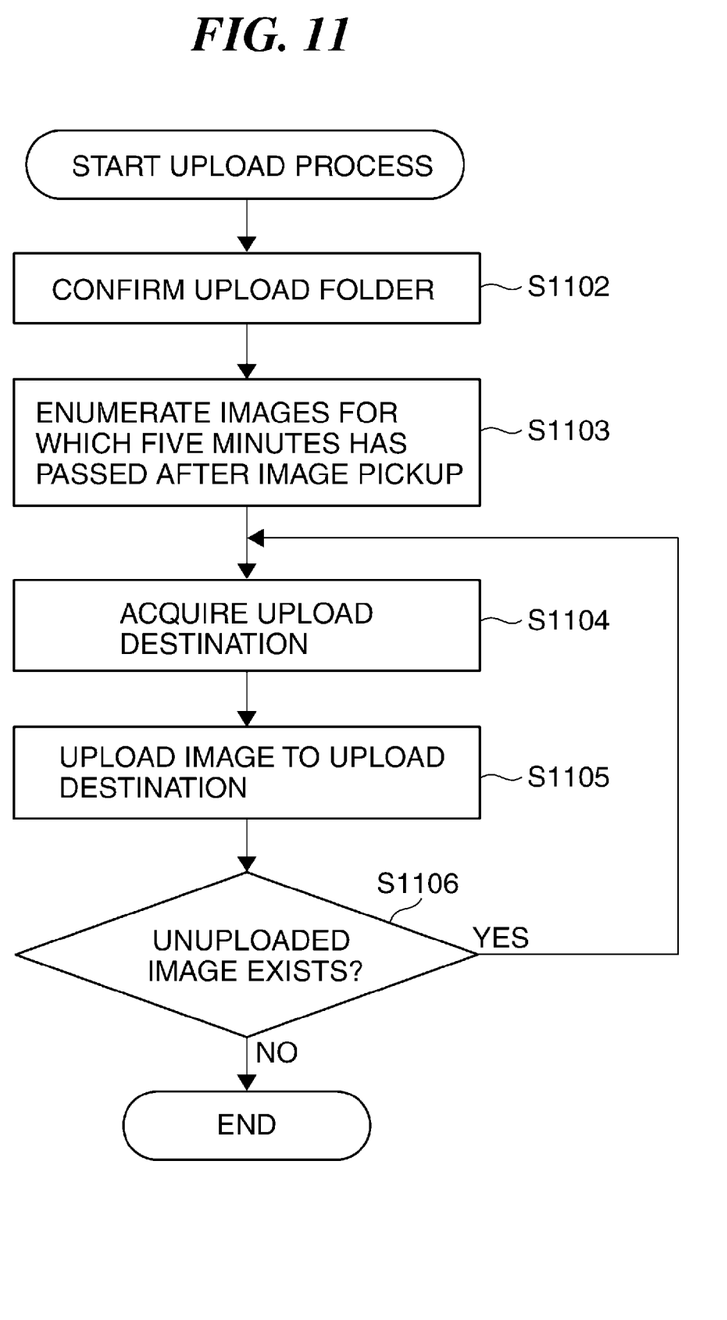
FIG. 11 is a flowchart for illustrating an upload process shown in FIG. 3.

FIG. 11 is a flowchart for illustrating the upload process shown in FIG. 3.

When having started the upload process, the CPU 304 confirms a folder in which the subject images to be uploaded are stored (upload folder) (step S1102). This upload folder is recorded as a recording destination in the registered shooter database shown in FIG. 7. Since a recording destination 502b is specified for the shooter of the identification information 502a in FIG. 7, the CPU 304 confirms the folder of the recording destination 502b as the upload folder.

Next, for the upload folder as a target, the CPU 304 searches for and enumerates images for which a predetermined time (for example, five minutes) has passed after image pickup (step S1103). Then, the CPU 304 confirms the upload destination 502c in the registered shooter database (step S1104).

After that, the CPU 304 uploads (that is, transmits) the subject images enumerated in step S1103 to the upload destination (transmission destination) 502c (step S1105).

When upload of one subject image is completed, the CPU 304 confirms whether or not unuploaded subject image exists among the enumerated subject images (step S1106). If an unuploaded subject image exists (step S1106: YES), the CPU 304 returns to the process of step S1104, acquires an upload destination again, and uploads the subject image to the server 309.

On the other hand, if an unuploaded subject image does not exist (step S1106: NO), the CPU 304 ends the upload process.

Thus, in the embodiment of the present invention, even in the case where a shooter who has been operating the camera 301 and performing image pickup intentionally has proxy image pickup performed by another person, a subject image obtained by the proxy image pickup can be recorded as an image shot by the original shooter.

It should be noted that, in the embodiment described above, the CPU 304 identifies a person existing in a subject image to obtain first identification information and identify a person existing in a shooter image to obtain second identification information. Then, the CPU 304 records the second identification information into the memory 307 as shooter information in metadata of the subject image, together with the image. Furthermore, if a person existing in a shooter image is identified, and the same person as the person identified from the shooter image is identified from a subject image, the CPU 304 records identification information about the same person as shooter information in the metadata of the subject image.

Further, if, after a person existing in a shooter image is identified, the same person as the person identified from the shooter image is identified from a subject image within a predetermined time, the CPU 304 records identification information about the same person as shooter information in the metadata of the subject image.

In addition, in the embodiment described above, image pickup processes by the subject camera 305 and the shooter camera 306 are executed in response to one image pickup instruction. Further, in the case of, after identifying a person existing in a shooter image, performing image pickup in a state that the same person as the person identified from the shooter image is identified from a subject image, the CPU 304 records identification information about the same person into the memory 307 as shooter information in the metadata of the subject image even if another person exists in a shooter image obtained by the shooter camera 306.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086317, filed Apr. 18, 2014, which is hereby incorporated by reference wherein in its entirety.

What is claimed is:

1. An image pickup apparatus comprising:
 a first image pickup unit configured to shoot a subject to obtain a first image;
 a second image pickup unit configured to shoot a shooter to obtain a second image, wherein the subject is different from the shooter;
 a first identification unit configured to identify a person existing in the first image to obtain first identification information indicating the person;
 a second identification unit configured to identify the shooter existing in the second image to obtain second identification information indicating the shooter;
 a recording unit configured to record the second identification information as shooter information of the first image, together with the first image; and
 a control unit configured to, if a person indicated by another information is the same person as the person indicated by the first identification information, control said recording unit to record the another information, instead of the second identification information, as the shooter information of the first image, wherein the another information is shooter information of another image previously obtained by said first image pickup unit.

2. The image pickup apparatus according to claim 1, wherein, if the same person as the shooter identified from the second image is identified from the first image within a predetermined time after the shooter existing in the second image is identified, said control unit records the identification information about the same person as the shooter information of the first image.

3. The image pickup apparatus according to claim 1, wherein image pickup processes of the first image pickup unit and the second image pickup unit are executed in response to one image pickup instruction.

4. The image pickup apparatus according to claim 1, wherein, at the time of performing image pickup in a state that, after the shooter existing in the second image is identified, the same person as the shooter identified from the second image is identified from the first image, said control unit records the identification information about the same person as the shooter information of the first image even if another person exists in the second image obtained by the second image pickup unit.

5. An image pickup apparatus at least provided with a first image pickup unit configured to shoot a subject to obtain a first image and a second image pickup unit configured to shoot a shooter to obtain a second image, the image pickup apparatus comprising:
 an identification unit configured to identify a person existing in each of the first image and the second image to obtain first identification information and second identification information, respectively; and
 a recording unit configured to, if the second identification information obtained in response to a previous image pickup instruction is included in the first identification information obtained in response to a next image pickup instruction, record a person corresponding to the second identification information obtained in response to the previous image pickup instruction into a recording medium as a shooter of the first image obtained in response to the next image pickup instruction.

6. The image pickup apparatus according to claim 5, further comprising a memory configured to store, for each user who uses the image pickup apparatus, user information for identifying the user and the second identification information in association with each other.

7. The image pickup apparatus according to claim 6, wherein a recording destination where the first image is to be recorded is specified in the user information, and
wherein said recording unit records the first image at the recording destination specified by the user information.

8. The image pickup apparatus according to claim 6, further comprising a transmission unit configured to, if a transmission destination to which the first image is to be transmitted is specified in the user information, transmit the first image to the transmission destination specified in the user information.

9. The image pickup apparatus according to claim 8, wherein the transmission destination is a server connected to the image pickup apparatus via a network.

10. The image pickup apparatus according to claim 6, wherein, if the second identification information obtained in response to the previous image pickup instruction is not included in the first identification information obtained in response to the next image pickup instruction, the second identification information obtained until predetermined time after the next image pickup instruction is compared with the second identification information associated with the user information, and, if the same person exists, said recording unit records the same person as a shooter of the next image pickup instruction.

11. A control method for an image pickup apparatus comprising a first image pickup unit configured to shoot a subject to obtain a first image and a second image pickup unit configured to shoot a shooter to obtain a second image, wherein the subject is different from the shooter, the control method comprising:
  a first identification step of identifying a person existing in the first image to obtain first identification information indicating the person;
  a second identification step of identifying the shooter existing in the second image to obtain second identification information indicating the shooter;
  a recording step of recording the second identification information as shooter information of the first image, together with the first image; and
  a control step of, if a person indicated by another information is the same person as the person indicated by the first identification information, controlling to record the another information, instead of the second identification information, as the shooter information of the first image, wherein the another information is shooter information of another previously obtained image.

12. A control method for an image pickup apparatus at least provided with a first image pickup unit configured to shoot a subject to obtain a first image and a second image pickup unit configured to shoot a shooter to obtain a second image, the control method comprising:
  an identification step of identifying a person existing in each of the first image and the second image to obtain first identification information and second identification information, respectively; and
  a recording step of, if the second identification information obtained in response to a previous image pickup instruction is included in the first identification information obtained in response to a next image pickup instruction, recording a person corresponding to the second identification information obtained in response to the previous image pickup instruction into a recording medium as a shooter of the first image obtained in response to the next image pickup instruction.

* * * * *